(12) United States Patent
Dagman et al.

(10) Patent No.: US 8,220,027 B1
(45) Date of Patent: Jul. 10, 2012

(54) METHOD AND SYSTEM TO CONVERT CONVENTIONAL STORAGE TO AN AUDIO/VIDEO SERVER

(75) Inventors: Vadim Dagman, Foster City, CA (US); Yaroslav Lisitsyn, Tomsk (RU); Kevin Roe, San Jose, CA (US)

(73) Assignee: Monsoon Multimedia, San Mateo, CA (US)

( * ) Notice: Subject to any disclaimer, the term of this patent is extended or adjusted under 35 U.S.C. 154(b) by 442 days.

(21) Appl. No.: 12/126,396

(22) Filed: May 23, 2008

(51) Int. Cl.
*H04N 7/173* (2011.01)

(52) U.S. Cl. .............................. 725/93; 725/80; 209/219

(58) Field of Classification Search ............ 725/87–104, 725/133, 134, 141, 142, 78–82; 709/217–231
See application file for complete search history.

(56) References Cited

U.S. PATENT DOCUMENTS

| | | | |
|---|---|---|---|
| 6,711,741 B2 * | 3/2004 | Yeo ................................ | 725/87 |
| 7,023,924 B1 * | 4/2006 | Keller et al. ............. | 375/240.26 |
| 7,764,863 B1 * | 7/2010 | Strasman et al. ............. | 386/343 |
| 2001/0047517 A1 * | 11/2001 | Christopoulos et al. ........ | 725/87 |

* cited by examiner

*Primary Examiner* — Annan Shang
(74) *Attorney, Agent, or Firm* — Kevin Roe

(57) ABSTRACT

A method and system to utilize an audio/video server in storing real time, previously recorded or otherwise obtained media data to one or more conventional storage device and making this stored media data available to media playback devices on a network. A first embodiment is a method to operate a video server including recording audio/video data to a storage module coupled to the a video server through at least one standardized port module, determining a need to provide a video file to the one or more playback devices; reading a video file from a storage module coupled to the video server through at least one standardized port module; and providing a version of the video file to one or more playback devices. The version of the video file can optionally be a trans-coded version of the video file, with a new video format, compression, bitrate, or combination of the preceding. A second embodiment is a system including a video server including a storage module having at least one standardized port module; a video server, coupled to the storage module through the at least one standardized port module; and one or more playback devices. These embodiments can be applied in several wired and wireless communication applications, or in combinations of such applications.

25 Claims, 16 Drawing Sheets

METHOD AND SYSTEM TO CONVERT CONVENTIONAL STORAGE TO AN AUDIO/VIDEO SERVER

BACKGROUND OF THE INVENTION

1. Field of the Invention

This invention relates to a method and system to utilize an audio/video server in storing real time media data to one or more conventional storage devices and making this stored media data available to media playback devices on a network.

2. Description of the Prior Art

Audio/video servers (e.g., audio/video streaming servers, and equivalents) can be used in many applications. These applications include controlling recording sessions and making recorded or stored audio/video data available to other devices. Such applications can involve audio and/or video transmissions over cable or other types of networks, or the transmission can be implemented by wireless transmissions. For example, some applications can include Universal Plug and Play (UPnP) audio/video applications, and these applications typically use UPnP AV Media Servers and UPnP Media Server Control Points.

UPnP AV Media Servers store and share digital media, such as photographs, movies, or music. There are UPnP Media Servers available for most operating systems and many hardware-platforms. UPnP AV Media Servers can either be categorized as software-based or hardware-based. Software-based UPnP AV Media Servers can be run on personals computers (PCs), mainly on Microsoft Windows, Linux, BSD, Unix or Mac OS X. Hardware-based UPnP AV Media Servers may run on any NAS (Network Attached Storage) devices or any specific hardware for delivering media, such as a PVR (Personal Video Recorder).

FIG. 1 illustrates a simplified block diagram of a prior art network with a PVR, in accordance with the prior art. This block diagram includes a PVR 100 with a built-in Storage Module 110 and one or more UPnP Media Server Control Points 158 on the Network 140. The PVR system 100 can handle recording of real time media data. The disadvantages of this prior art include: there is no live video streaming function to other devices on the Network 140, the Storage Module 110 is built-in adding an extra cost to a PVR 100, there is limited storage capacity (additional memory cannot be added easily), and the entire unit needs to be replaced if the Storage Module 110 fails. The PVR 100 can provide a recoding function from a live audio/video source (e.g., a TV broadcast) for later playback. One of the most widely known examples of a PVR is TiVO®.

FIG. 2 illustrates a simplified block diagram of a prior art network with a dedicated device interface, in accordance with the prior art. This prior art includes a Dedicated Device Interface 102 (e.g., a NSLU2 Network Storage Link for USB 2.0 Disk Drives), one Storage Module 110 attached to a USB port of the Dedicated Device Interface 102 and one or more UPnP Media Server Control Points 158 on the Network 140. This prior art approach converts the Storage Module 110 into an UPnP AV Media Server. However, this prior art approach has the following disadvantages: only USB hard drives are supported (there is no IEEE 1934, Ethernet, or equivalent standardized network connectivity), there is no media recording function to the hard drive, and there is no live video streaming function to other devices on the Network 140.

FIG. 3. illustrates a simplified block diagram of a prior art network with a NAS drive 170 and one or more UPnP Media Server Control Points 158 on the Network 140, in accordance with the prior art. This type of network can make media files available to UPnP Media Server Control Points 158 on the Network 140. However, this prior art approach has the following disadvantages: there is no media recording function, there is no live video streaming function to other devices on the Network 140, if the memory inside the NAS drive 170 fails then the entire NAS drive 170 must be replaced, there is only a fixed memory capacity, and the NAS drive 170 cannot be upgraded with more memory capacity by attaching additional general purpose storage devices.

Essentially, a NAS drive system is a file-level computer data storage coupled to a computer network. There is an operating system and other software on the NAS unit to provide the functionality of data storage, data access, and the management of these functions. In other words, NAS systems are server appliances. Often minimal-functionality or stripped-down operating systems are used on NAS systems. NAS systems usually contain one or more hard disks, often arranged into logical, redundant storage containers or RAIDs (redundant arrays of independent disks). NAS systems remove the responsibility of file serving from other servers on the network. It should be noted that a NAS system is effectively a server in itself, with all major components of a typical PC—a CPU, motherboard, RAM, etc.

In view of the foregoing, what is needed is an improved method and system to make a standard storage module available on a network for media recording and playback.

SUMMARY OF THE INVENTION

The present invention can be implemented in numerous ways, such as by a method or a system. Two aspects of the invention are described below.

A first aspect of the invention is directed to a method to operate a video server. The method includes recording live audio and/or video data to the storage module coupled to the video server through at least one standardized port module; streaming live audio and/or video data to display devices on the network for rendering audio/video data; streaming live audio and/or video data to devices on the network for storing audio/video data on storage modules connected to or included in these devices; detecting the presence of one or more playback devices coupled to a network including a video server; determining a need to provide a video file to the one or more playback devices; reading a video file from a storage module coupled to the video server through at least one standardized port module; and providing a version of the video file to one or more playback devices coupled to the video server.

A second aspect of the invention is directed to a system including a video server. The system includes a storage module having at least one standardized port; a video server, coupled to the storage module through the at least one standardized port module; one or more playback devices; and a network connecting the video server with the playback devices.

These and other objects and advantages of the invention will become apparent to those skilled in the art from the following detailed description of the invention and the accompanying drawings.

DETAILED DESCRIPTION OF THE PREFERRED EMBODIMENT

Figure 1:
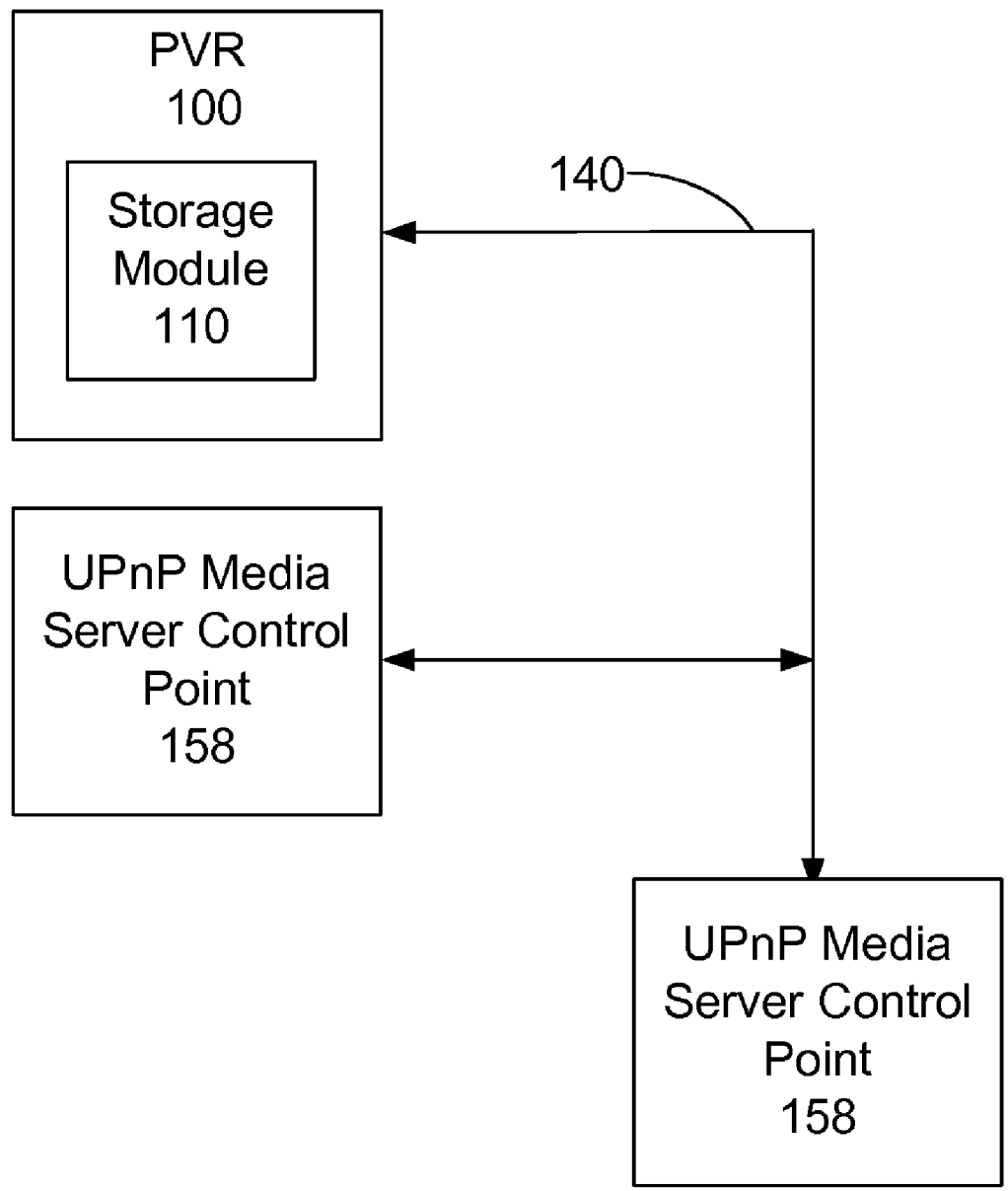
FIG. 1 illustrates a simplified block diagram of a prior art network with a PVR, in accordance with the prior art.
Figure 2:
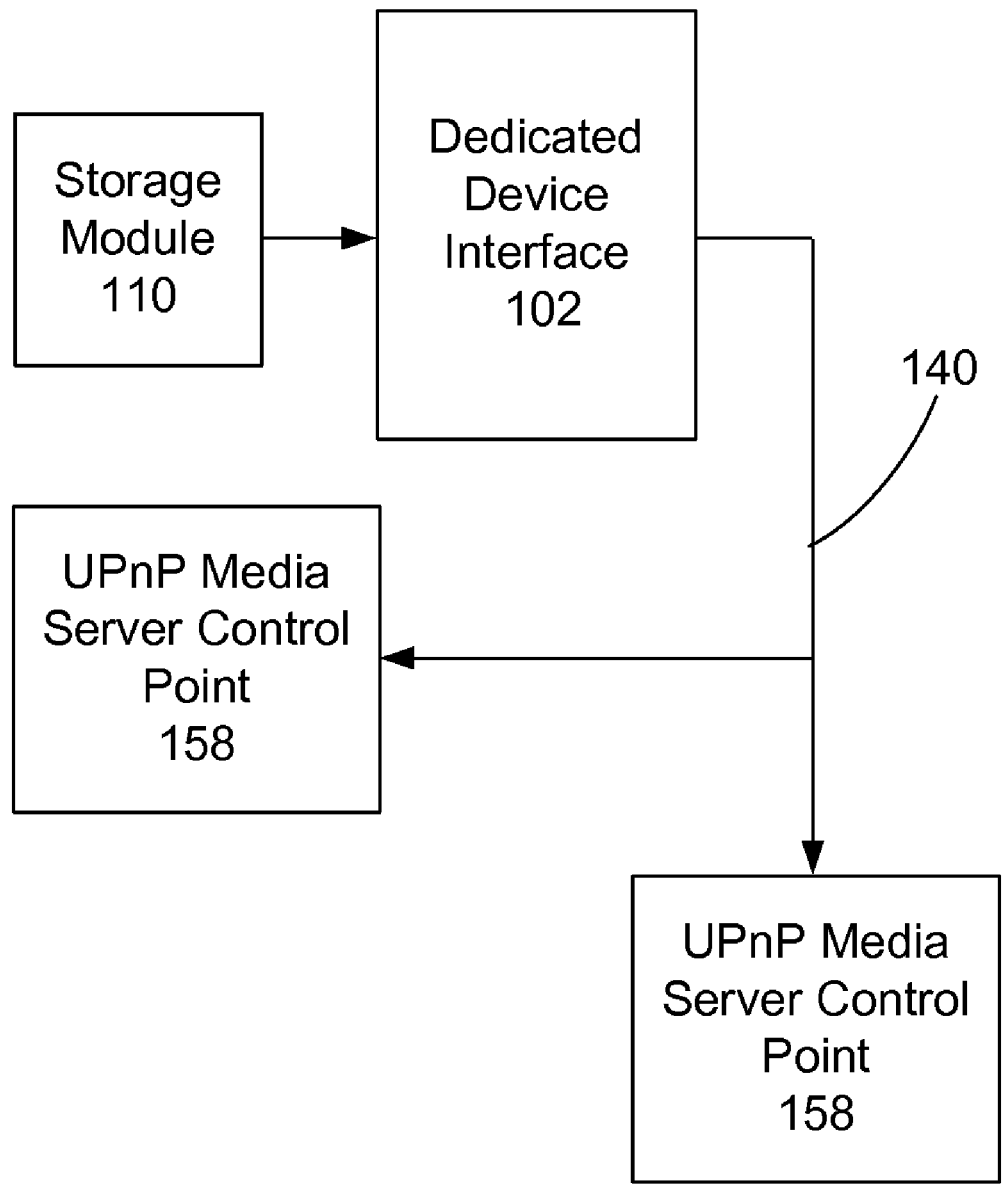
FIG. 2 illustrates a simplified block diagram of a prior art network with a dedicated device interface, in accordance with the prior art.
Figure 3:
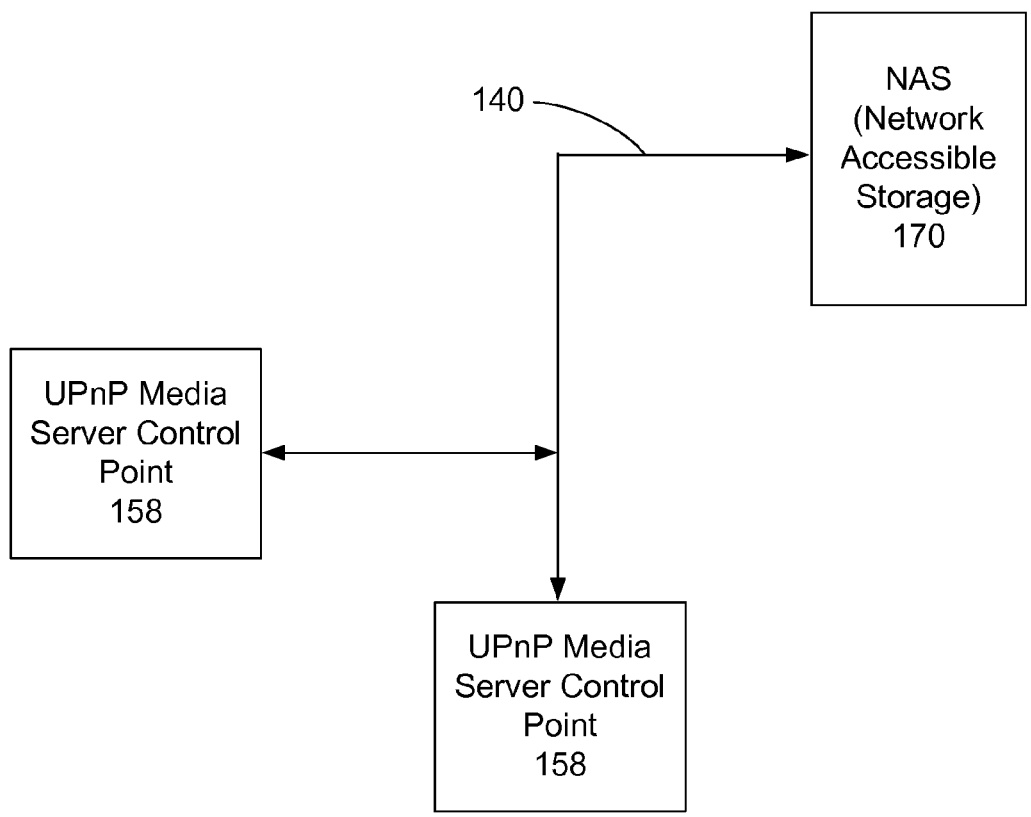
FIG. 3 illustrates a simplified block diagram of a prior art network with a NAS drive and one or more UPnP Media Server Control Points on the network, in accordance with the prior art.

The invention provides a method and a system to control at least one audio/video server, which could be used in either wired or wireless communication systems that provide audio and/or video information. Various embodiments of the invention can be applied to communication applications, biological applications, medical applications, electronic applications, and any other applications where such methods and systems can be beneficially used. In this specification, drawings, and claims, any instance of the term radio-frequency is defined as any electromagnetic signal frequency in the frequency range of 50,000 to 100,000,000,000 cycles per second (Hertz). However, the scope of the invention should not be considered to be limited only to communication systems in accordance to these technical specifications. Certain embodiments of the invention are also applicable to other data transmission technologies, using cable communications, and other wired and wireless communications.

The present invention includes various operations and/or modules, which will be described below. The operations of the present invention may be performed by hardware components or may be embodied in machine-executable instructions, which may be used to cause a general-purpose or special-purpose processor programmed with the instructions to perform the operations. In certain embodiments, the method may be performed by processing logic that may comprise hardware (e.g., dedicated logic, programmable logic, microcode, or an equivalent), software (such as run on a general purpose computer system, a dedicated machine, or an equivalent data processing system), or a combination of both hardware and software modules.

The present invention may be provided as a computer program product, or software, that may include a machine-readable medium having stored thereon instructions, which may be used to program a computer system (or other equivalent data processing systems or electronic devices) to perform a process according to the present invention. A machine-readable medium includes any mechanism for storing or transmitting information in a form (e.g., software, processing application) readable by a machine (e.g., a computer, or an equivalent data processing system or electronic device). The machine-readable medium may include, but is not limited to, magnetic storage medium (e.g., floppy diskette); optical storage medium (e.g., CD-ROM, DVD, or an equivalent); magneto-optical storage medium; read only memory (ROM); random access memory (RAM); erasable programmable memory (e.g., EPROM, EEPROM, or an equivalent); flash memory; electrical, optical, acoustical or other form of propagated signal (e.g., carrier waves, infrared signals, digital signals, or an equivalent); or other type of medium suitable for storing electronic instructions. The present invention may also be practiced in distributed computing environments where the machine-readable medium is stored on and/or executed by more than one data processing system.

Audio/video servers (e.g., audio/video streaming servers, and equivalents, henceforth referred to below as video servers for convenience) can be used in applications supporting Universal Plug and Play (UPnP) Media Server Control Points and/or other media devices. Such applications include controlling recording sessions and controlling audio/video compression for transmission to other devices. Such applications can involve audio and/or video transmissions over cable or other types of networks, or the transmission can be by wireless transmissions using various protocols (e.g., IEEE 802.16 (g) for wireless radio-frequency networks, or an equivalent).

Figure 4A:
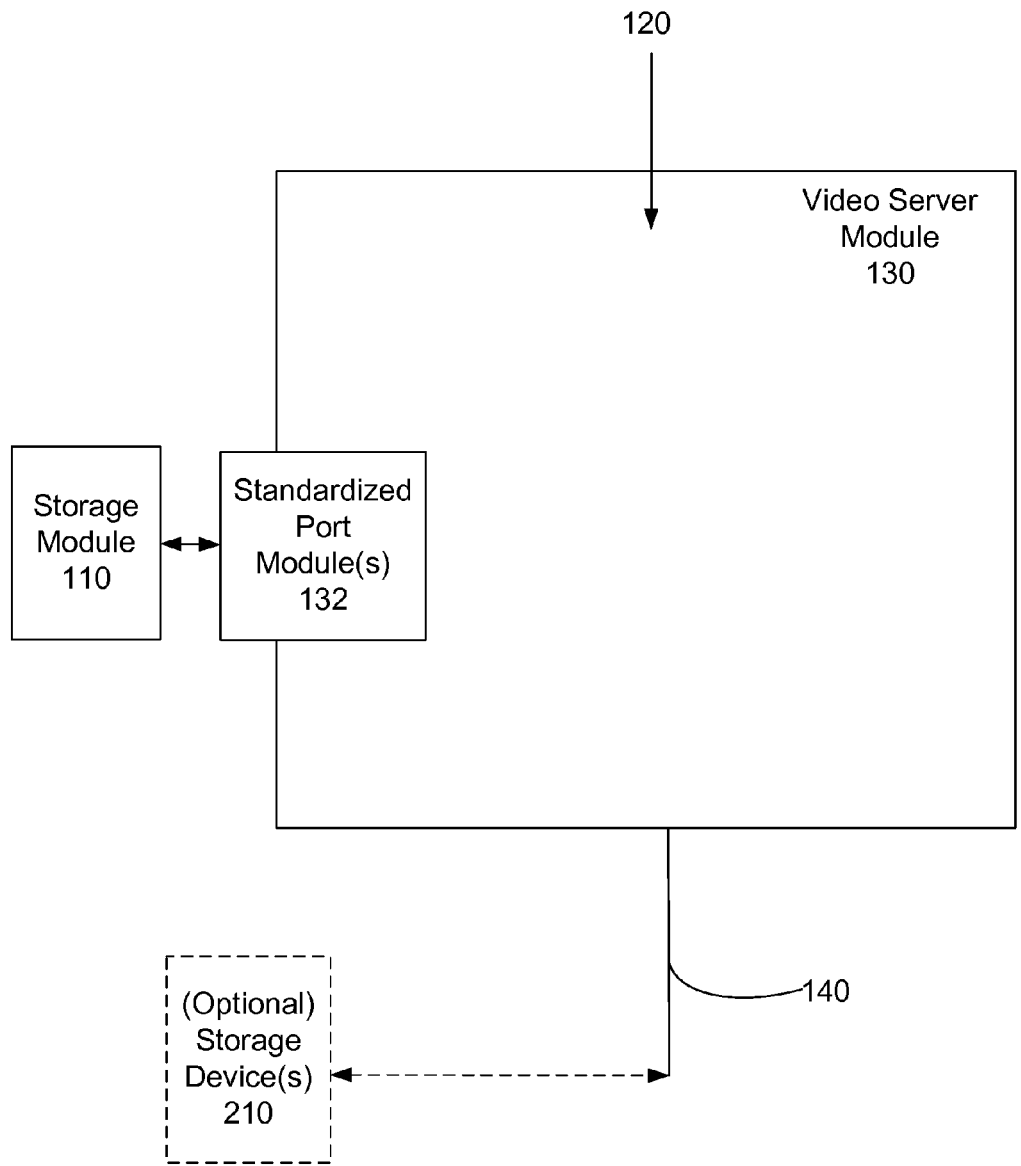
FIG. 4A illustrates a block diagram of a system including a video server, according to one embodiment of the invention.

FIG. 4A illustrates a block diagram of a system including a video server, according to one embodiment of the invention. This system includes a Storage Module (e.g., one or more hard disk drives, magneto-optical disks, video disks, or equivalents) 110, a Video Source (e.g., an analog or a digital video source, such as video camera, terrestrial antenna, cable, satellite dish, wireless source of video, or an equivalent) 120, a Video Server Module 130, one or more Standardized Port Module(s) (e.g., including any version of a Universal Serial Bus (USB) port, IEEE 1394 (FireWire) port, Ethernet port, or an equivalent standardized port) 132 coupled to the Video Server Module 130, a Network 140, and optionally one or more Storage Devices 210 attached to the Network 140. The input data from Video Source 120 can either have an analog format (e.g., component video, composite video, S-Video, coax cable, or an equivalent) or a digital format (e.g., High-Definition Multimedia Interface (HDMI), Digital Visual Interface (DVI), IEEE 1394 (FireWire), Digital Broadcast (ATSC/QAM), TOSLINK® optical, composite coax digital, or an equivalent).

Figure 4B:
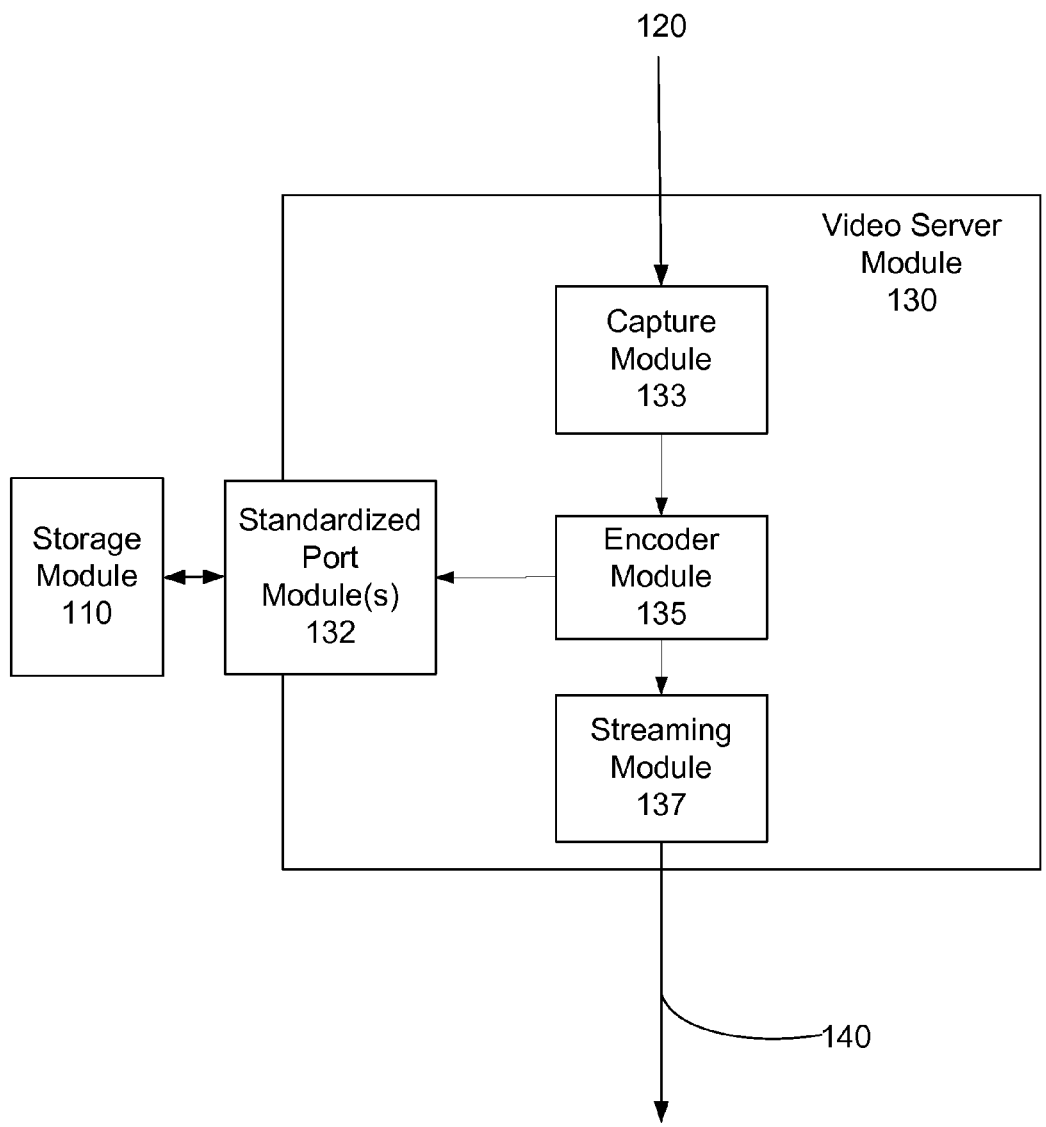
FIG. 4B illustrates a block diagram of a system including a video server, according to one embodiment of the invention.

In one embodiment illustrated in FIG. 4B, the Video Server Module 130 includes a Capture Module 133 (e.g., a Video Processor NXP7136, available from NXP Semiconductor, with corporate headquarters in Eindhoven, The Netherlands, or an equivalent capture module) to capture and digitize analog audio/video signals, an Encoder Module 135 (e.g., a ViXS 2110 Audio/Video MPEG-4/MPEG-2 encoder, available from ViXS, Inc., with corporate headquarters in Toronto, Ontario, Canada, or an equivalent encoder module available from Broadcom Corporation, Conexant Systems, Inc., Texas Instruments, Inc., or an equivalent supplier) to compress digitized audio/video data, and a Streaming Module 137 to send compressed audio/video data to Network 140. This system includes a Storage Module 110, a Video Source 120, a Video Server Module 130, one or more Standardized Port Module(s) 132 coupled to the Video Server Module 130, and a Network 140

Figure 4C:
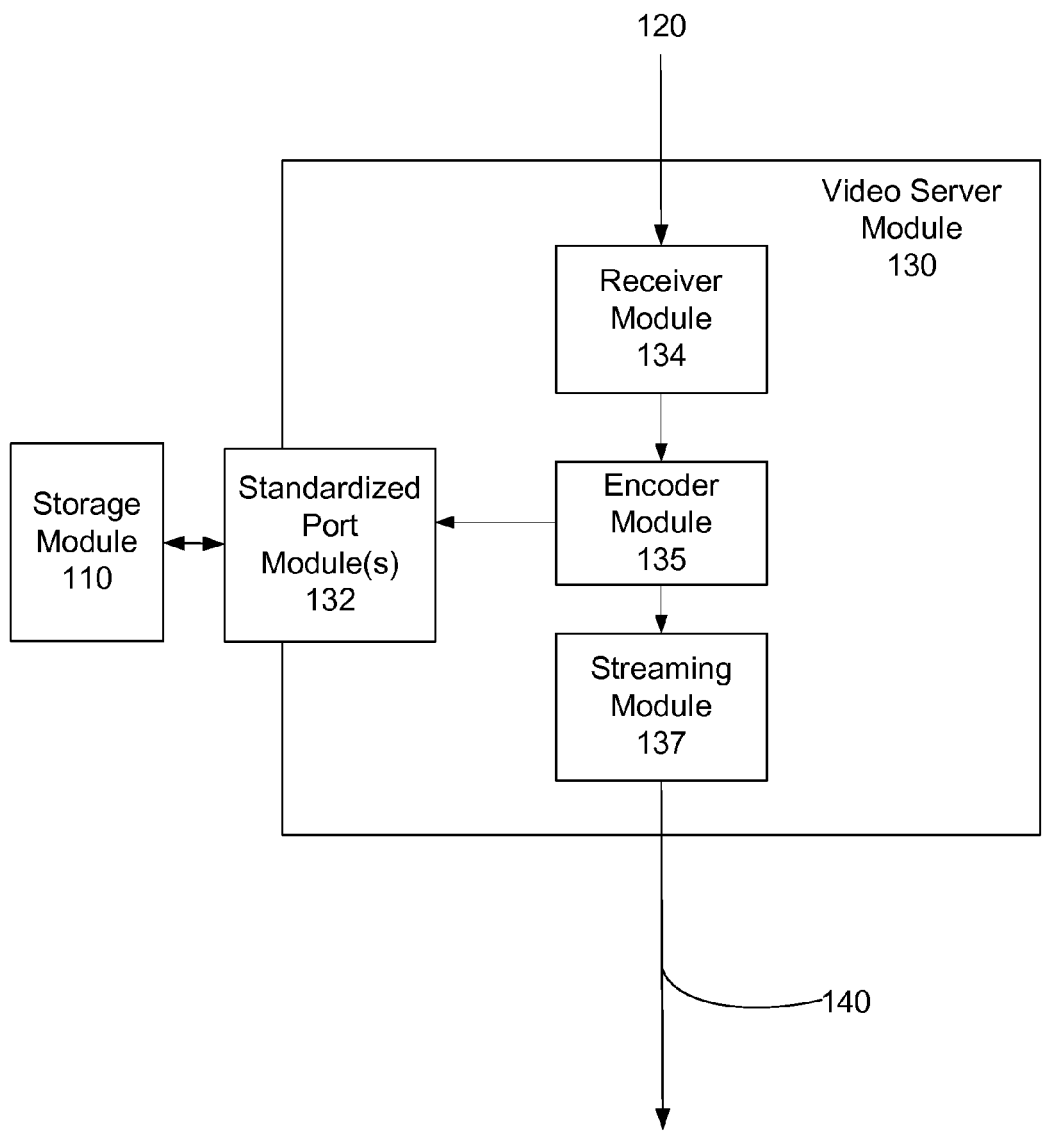
FIG. 4C illustrates a block diagram of a system including a video server, according to one embodiment of the invention.

In another embodiment illustrated in FIG. 4C , the Video Server Module 130 includes a Receiver Module 134 (e.g., a HDMI port controlled by a TDA9975 HDMI receiver available from NXP Semiconductor, with corporate headquarters in Eindhoven, The Netherlands, or an equivalent receiver module) to receive digital uncompressed audio/video data, an Encoder Module 135 to encode uncompressed digital audio/video data, and a Streaming Module 137 to send compressed audio/video data to Network 140. This system includes a Storage Module 110, a Video Source 120, a Video Server Module 130, one or more Standardized Port Module(s) 132 coupled to the Video Server Module 130, and a Network 140.

Figure 4D:
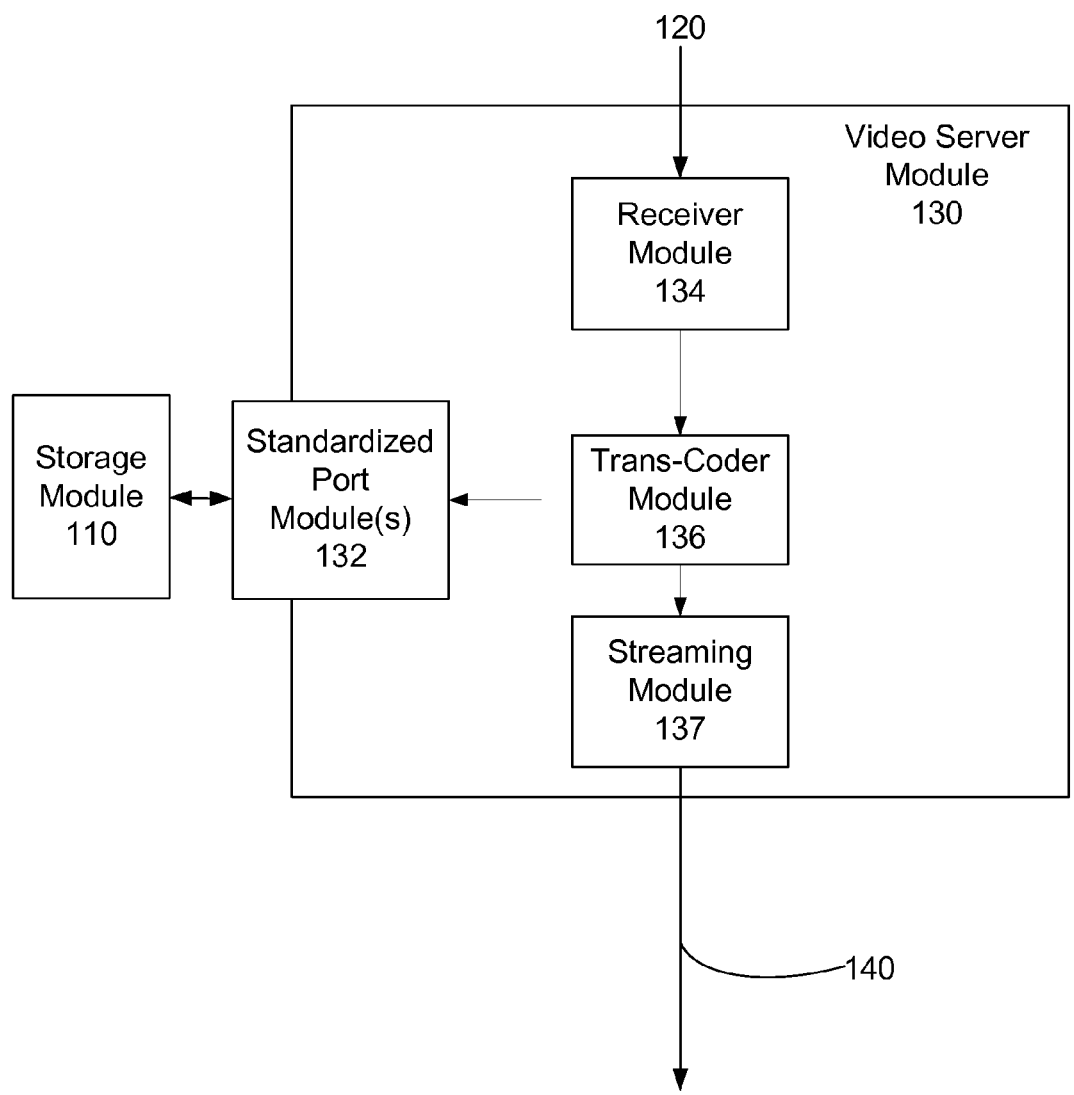
FIG. 4D illustrates a block diagram of a system including a video server, according to one embodiment of the invention.

In another embodiment illustrated in FIG. 4D, the Video Server Module 130 includes a Receiver Module 134 (e.g., a digital tuner TDA18271 available from NXP Semiconductor, and a demodulator TD10078 available from NXP Semiconductor, or an ATSC LG3304 demodulator available from LG Electronics, Inc., with corporate headquarters in Seoul, Korea, or an equivalent receiver module) to receive digital compressed audio/video data, a Trans-Coder Module 136 to trans-code compressed digital audio/video data to a different bitrate and/or another compression format, and a Streaming Module 137 to send compressed audio/video data to Network 140. This system includes a Storage Module 110, a Video Source 120, a Video Server Module 130, one or more Standardized Port Module(s) 132 coupled to the Video Server Module 130, and a Network 140.

Figure 4E:
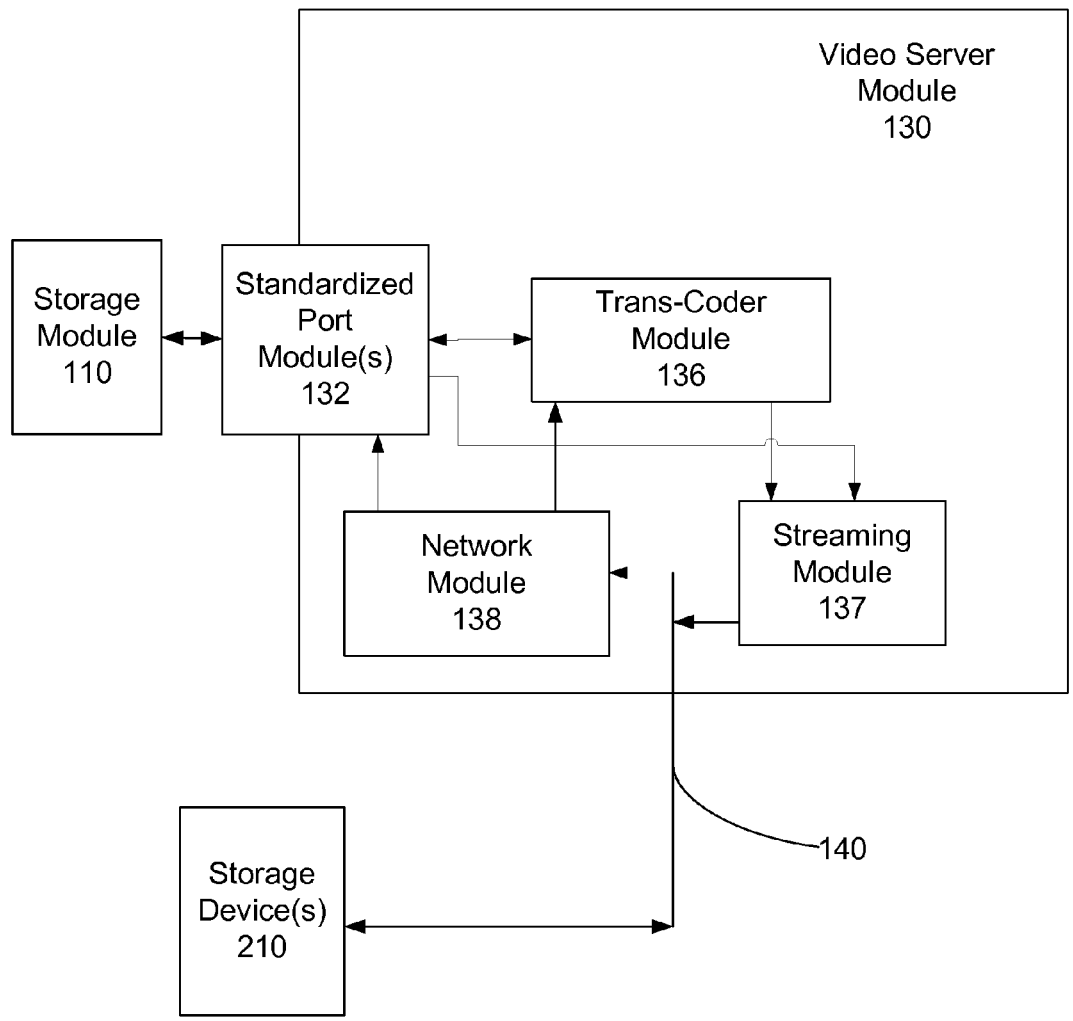
FIG. 4E illustrates a block diagram of a system including a video server, according to one embodiment of the invention.

In another embodiment illustrated in FIG. 4E, the Video Server Module 130 includes a Network Module 138 to receive audio/video data from Network 140, a Trans-Coder Module 136 to trans-code compressed digital audio/video data to a different bitrate and/or another compression format, and a Streaming Module 137 to send compressed audio/video data to Network 140. This system includes a Storage Module 110, a Video Server Module 130, one or more Standardized Port Module(s) 132 coupled to the Video Server Module 130, a Network 140, and one or more Storage Devices 210 attached to the Network 140.

Figure 4F:
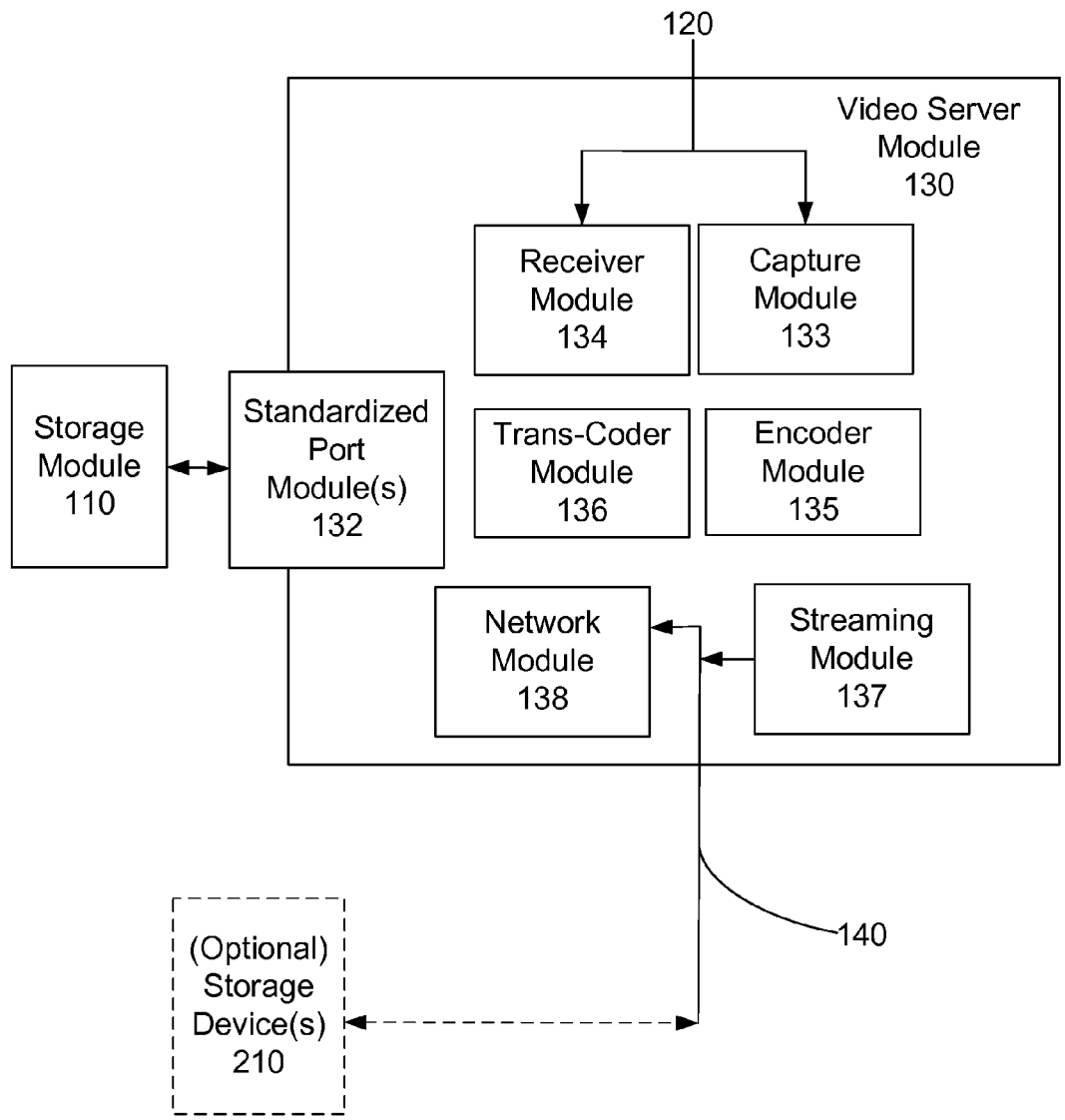
FIG. 4F illustrates a block diagram of a system including a video server, according to one embodiment of the invention.

In another embodiment illustrated in FIG. 4F, the Video Server Module 130 includes a Capture Module 133 to capture and digitize analog audio/video signals, a Receiver Module 134 to receive digital compressed and uncompressed audio/video data, an Encoder Module 135 to compress digitized or uncompressed audio/video data, a Trans-Coder Module 136 to trans-code compressed digital audio/video data to a different bit-rate and/or another compression format, a Streaming Module 137 to send compressed audio/video data to Network 140, and a Network Module 138 to receive audio/video data from Network 140. This system includes a Storage Module 110, a Video Source 120, a Video Server Module 130, one or more Standardized Port Module(s) 132 coupled to the Video Server Module 130, a Network 140, and optionally one or more Storage Devices 210 attached to the Network 140.

In embodiments of the invention illustrated in FIGS. 4A-4F, the system allows direct recording to the Storage Module 110. In other embodiments of the invention illustrated in FIGS. 4A-4F, the system allows recording to the Storage Device 210 and/or copying of the video data from the Storage Device 210 to the Storage Module 110 by way of Network 140. In other embodiments of the invention illustrated in FIGS. 4A-4F, the system allows for direct reading from the Storage Module 110, by way of at least one Standardized Port Module 132 coupled to the Video Server Module 130. In other embodiments of the invention illustrated in FIGS. 4A-4F, the Storage Module 110 includes at least one Universal Serial Bus (USB) port of any version, IEEE 1394 (FireWire) port, an Ethernet port, or an equivalent standardized port. In another embodiment, a supplemented USB, such as a Wireless USB, is used as a port. In one embodiment, the Storage Module 110 includes one or more magnetic hard disk drives with a port, such as a USB port or an equivalent standardized port. In another embodiment, the Storage Module includes a magneto-optical disk drive and/or an optical disk drive with a port, such as a USB port or an equivalent standardized port.

Figure 5:
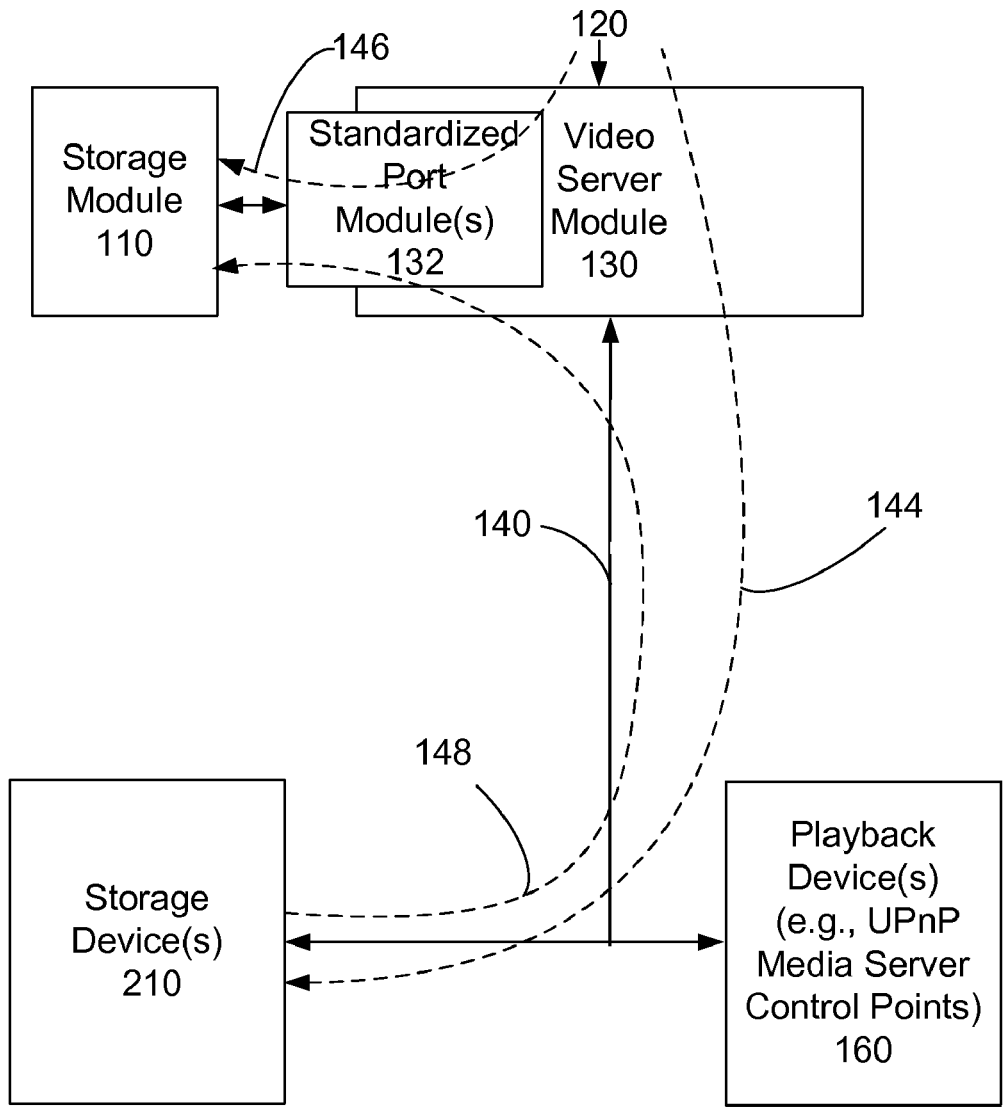
FIG. 5 illustrates a block diagram of a system including a video server, according to one embodiment of the invention.

The video data, while going through the Video Server Module 130, as in embodiments illustrated in FIGS. 4C-4F, can optionally be trans-coded (e.g., formatted in another format different to the original format, compressed in format, or changed in bit-rate, or any combination of the preceding, and so forth) to better match the limitations and capabilities of the transmission Network 140 and/or intended playback device. In one embodiment, a Video Server Module 130 performs the trans-coding of one or more video files when the one or more video files are read from the Storage Module 110, before they are supplied to a Playback Device 160 (e.g., a UPnP Media Server Control Point, as shown in FIG. 5). In another embodiment, the trans-coding of one or more video files could be performed while the one or more video files are copied from a Storage Device 210 and stored on the Storage Module 110 so that additional processing time will not be required to perform the trans-coding when a Playback Device 160 is waiting for the one or more video files to be read from the Storage Module 110.

FIG. 5 illustrates a block diagram of a system including a video server, according to one embodiment of the invention. This system includes a Storage Module (e.g., one or more hard disk drives, magneto-optical disks, video disks, or equivalents) 110, a Video Source (e.g., an analog or a digital video source, such as video camera, cable, satellite dish, wireless source of video, or an equivalent) 120, a Video Server Module 130, at least one Standardized Port Module(s) (e.g., including any version of a Universal Serial Bus (USB) port, IEEE 1394 (FireWire) port, or an equivalent standardized port) 132 coupled to the Video Server Module 130, a Network (e.g., a Local Area Network, or an equivalent network) 140, one or more Storage Devices 210 (e.g. a PC with a hard drive or optical disc or any other embedded to externally attached storage module, NAS drive, or any other network attached device with storage capability), and one or more Playback Devices 160 (e.g., UPnP Media Server Control Points). In one embodiment of the invention, the Storage Module 110 includes at least one Universal Serial Bus (USB) port of any version, IEEE 1394 (FireWire) port, an Ethernet port, or an equivalent standardized port. In another embodiment, a supplemented USB, such as Wireless USB, is used as a port. In one embodiment, the Storage Module 110 includes one or more magnetic hard disk drives with a port, such as a USB port or an equivalent standardized port. In another embodiment, the Storage Module 110 includes a magneto-optical disk drive and/or an optical disk drive with a port, such as a USB port or an equivalent standardized port.

The dotted line 146 shows the data flow during a recording made on the Storage Module 110, where the data is coming from the Video Source 120. Input data from Video Source 120 can either have an analog format or a digital format as previously listed. The dotted line 144 shows the data flow during a recording made on the Storage Device 210, where the data is coming from the Video Source 120 through the Video Server Module 130 and the Network 140. The dotted line 148 shows the file data flow during copying of the audio/video data from one or more Storage Devices 210 to the Storage Module 110 through the Video Server Module 130. While being copied from the one or more Storage Devices 210, the file data can be trans-coded by the Video Server Module 130 before being stored on the Storage Module 110.

Figure 6:
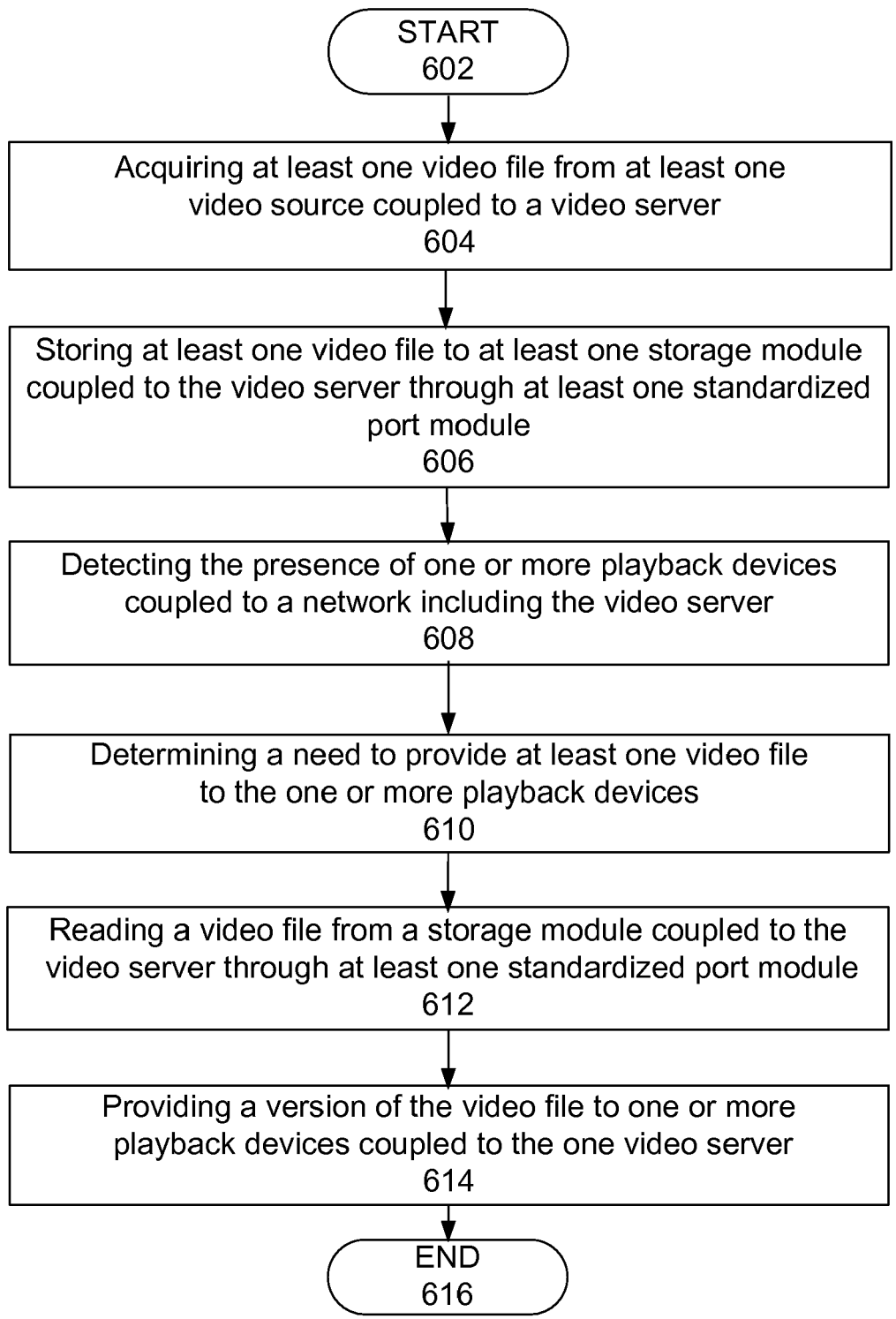
FIG. 6 illustrates a flowchart of a method to operate a video server, according to one embodiment of the invention.

FIG. 6 illustrates a flowchart of a method to operate a video server, according to one embodiment of the invention. The method starts in operation 602. Operation 604 is next and includes acquiring at least one video file from at least one video source coupled to a video server. The video source could be a video source coupled directly to the video server module, or the video source could be one or more storage devices coupled to a network. Operation 606 is next and includes storing at least one video file to at least one storage module through at least one standardized port module coupled to the video server. In one embodiment of the invention, a trans-coded version of at least one video file is stored in at least one storage module. In another embodiment of the invention, a non-trans-coded version of at least one video file is stored in at least one storage module. In one embodiment of the invention, the at least one standardized port module is a USB port module, or an equivalent standardized port module. Operation 608 is next and includes detecting the presence of one or more playback devices coupled to a network including the video server. Operation 610 is next and includes determining a need to provide at least one video file to one or more playback devices. For example, determining this need to provide at least one video file could include the standard UPnP protocol between UPnP devices on the network. Operation 612 is next and includes reading a video file from a storage module coupled to the video server through at least one standardized port module. The standardized port module is a USB port in one embodiment of the invention. Operation 614 is next and includes providing a version of the video file to one or more playback devices coupled to the video server. The method ends in operation 616. In one embodiment of the invention, the one or more playback devices are UPnP Media Server Control Points and the local network is a LAN.

Figure 7:
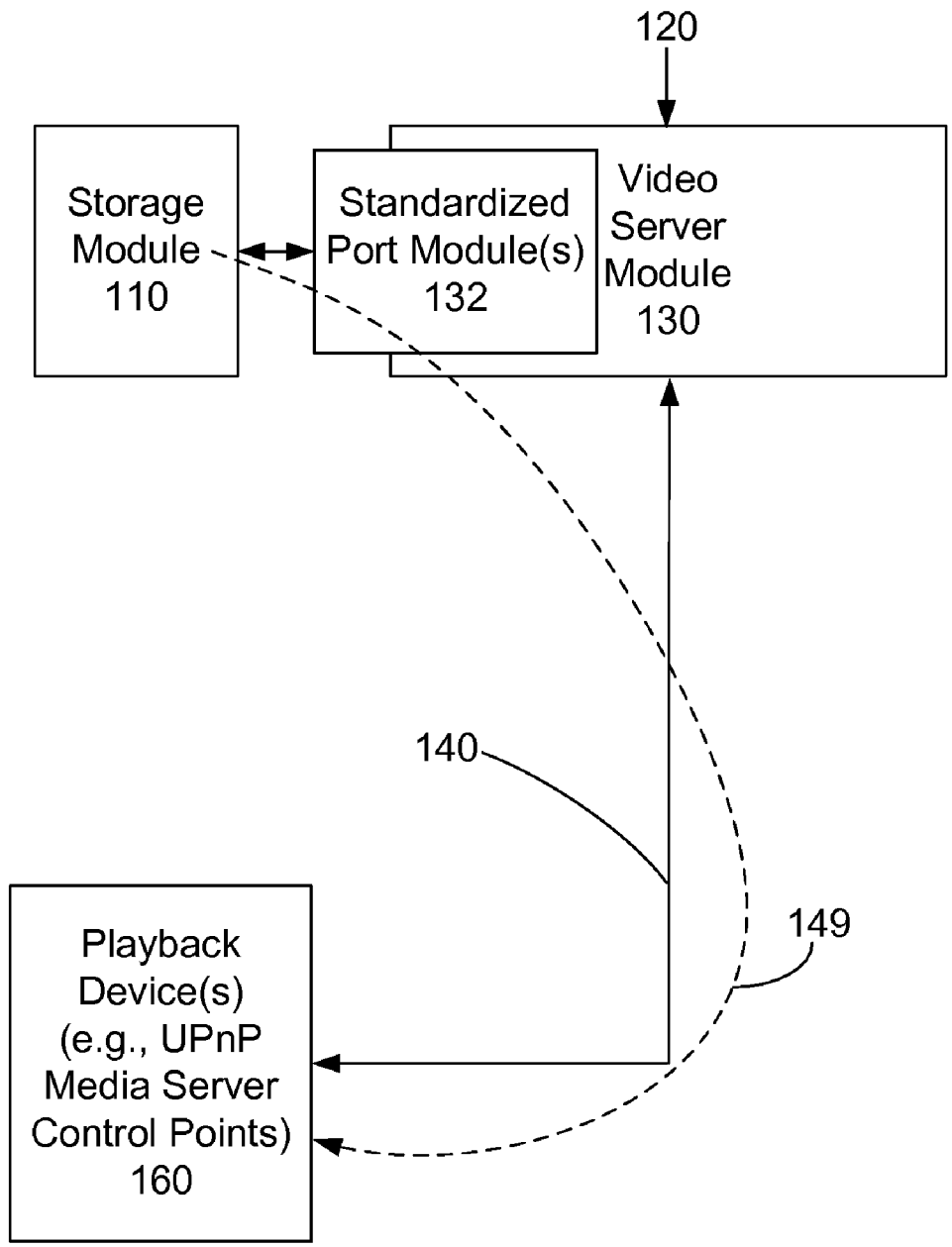
FIG. 7 illustrates a block diagram of a system including a video server, according to another embodiment of the invention.

FIG. 7 illustrates a block diagram of a system including a video server, according to one embodiment of the invention. This system includes a Storage Module 110, a Video Source 120, a Video Server Module 130, at least one Standardized Port Module (e.g., a USB port, or an equivalent standardized port) 132 coupled to the Video Server Module 130, a Network 140, and one or more Playback Devices 160 (e.g., UPnP Media Server Control Points). Dotted line 149 shows the path of how one or more video files would be provided to one or more Playback Devices 160 (e.g., UPnP Media Server Control Points).

Figure 8:
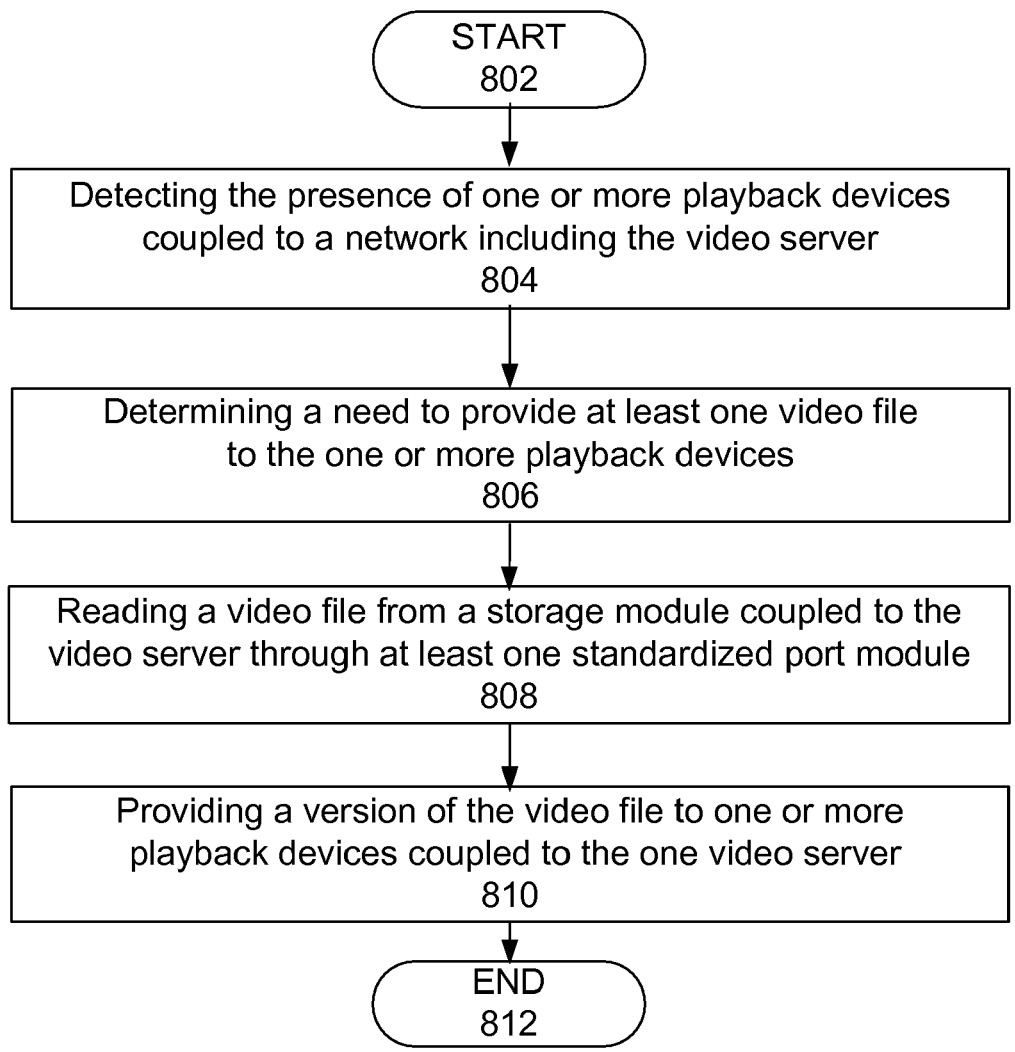
FIG. 8 illustrates a flowchart of a method to operate a video server, according to another embodiment of the invention.

FIG. 8 illustrates a flowchart of a method to operate a video server, in accordance with another embodiment of the invention. The method starts in operation 802. Operation 804 is next and includes detecting the presence of one or more playback devices coupled to a network including a video server. Operation 806 is next and includes determining a need to provide at least one video file to one or more playback devices. Operation 808 is next and includes reading a video file from a storage module coupled to the video server through at least one standardized port module. The standardized port module is a USB port in one embodiment of the invention. Operation 810 is next and includes providing a version of the video file to one or more playback devices coupled to the video server. The method ends in operation 812.

Figure 9:
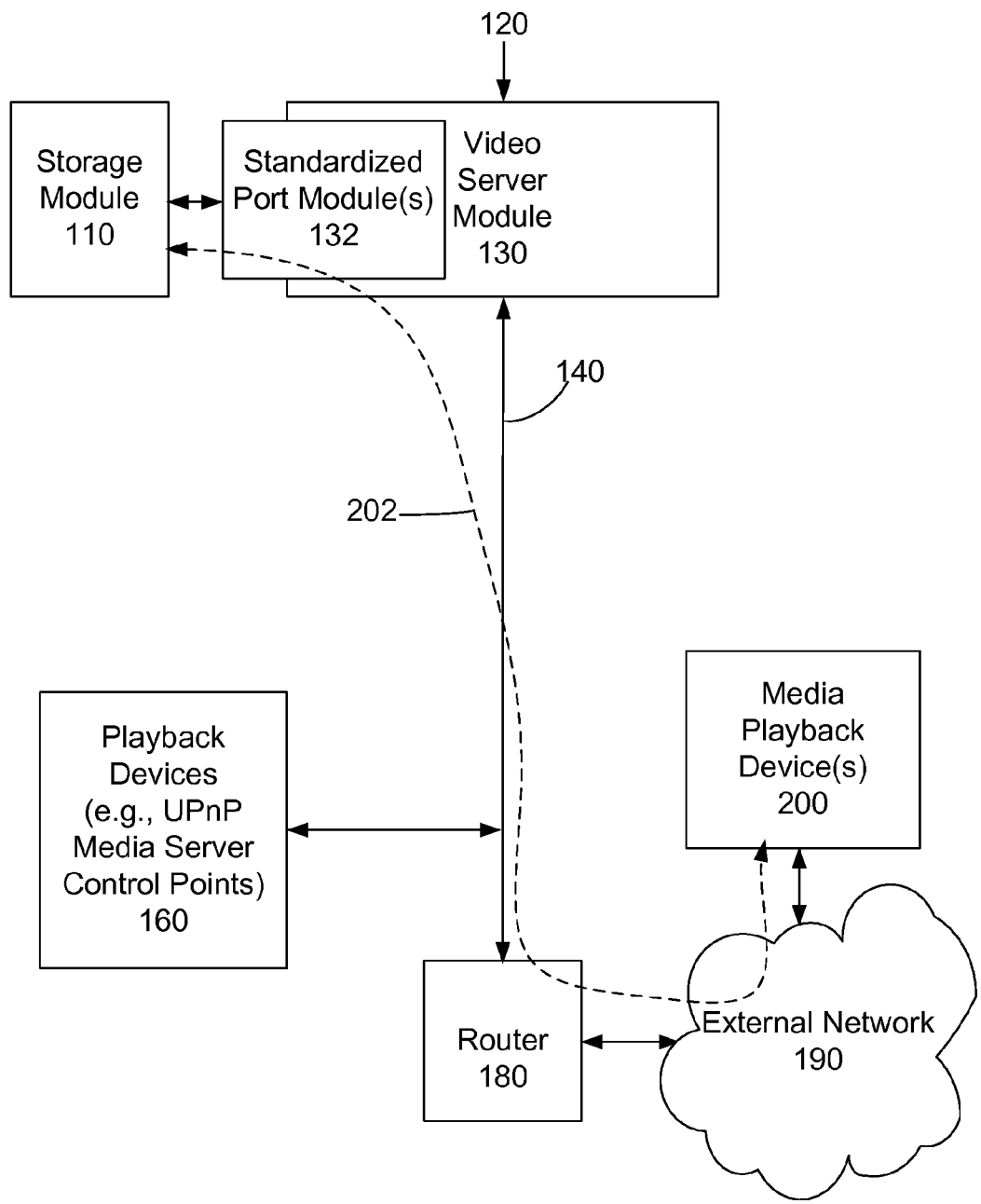
FIG. 9 illustrates a block diagram of a system including a video server, according to another embodiment of the invention.

FIG. 9 illustrates a system including a video server, in accordance with another embodiment of the invention. This system includes a Storage Module 110, a Video Source 120, a Video Server Module 130, at least one Standardized Port Module (e.g., a USB port, or an equivalent standardized port) 132 coupled to the Video Server Module 130, a Network 140, one or more Playback Devices 160 (e.g., UPnP Media Server Control Points), a router 180, an External Network (e.g., the Internet) 190, and one or more Media Playback Devices 200 (e.g., a cell phone, PC, or an equivalent media playback device connected to any external network). Dotted line 202 represents file data flow from the Storage Module 110 to a Media Playback Device 200. In one embodiment the data is trans-coded to better match the limitations and capabilities of the External Network 190 and/or Media Playback Device 200.

Figure 10:
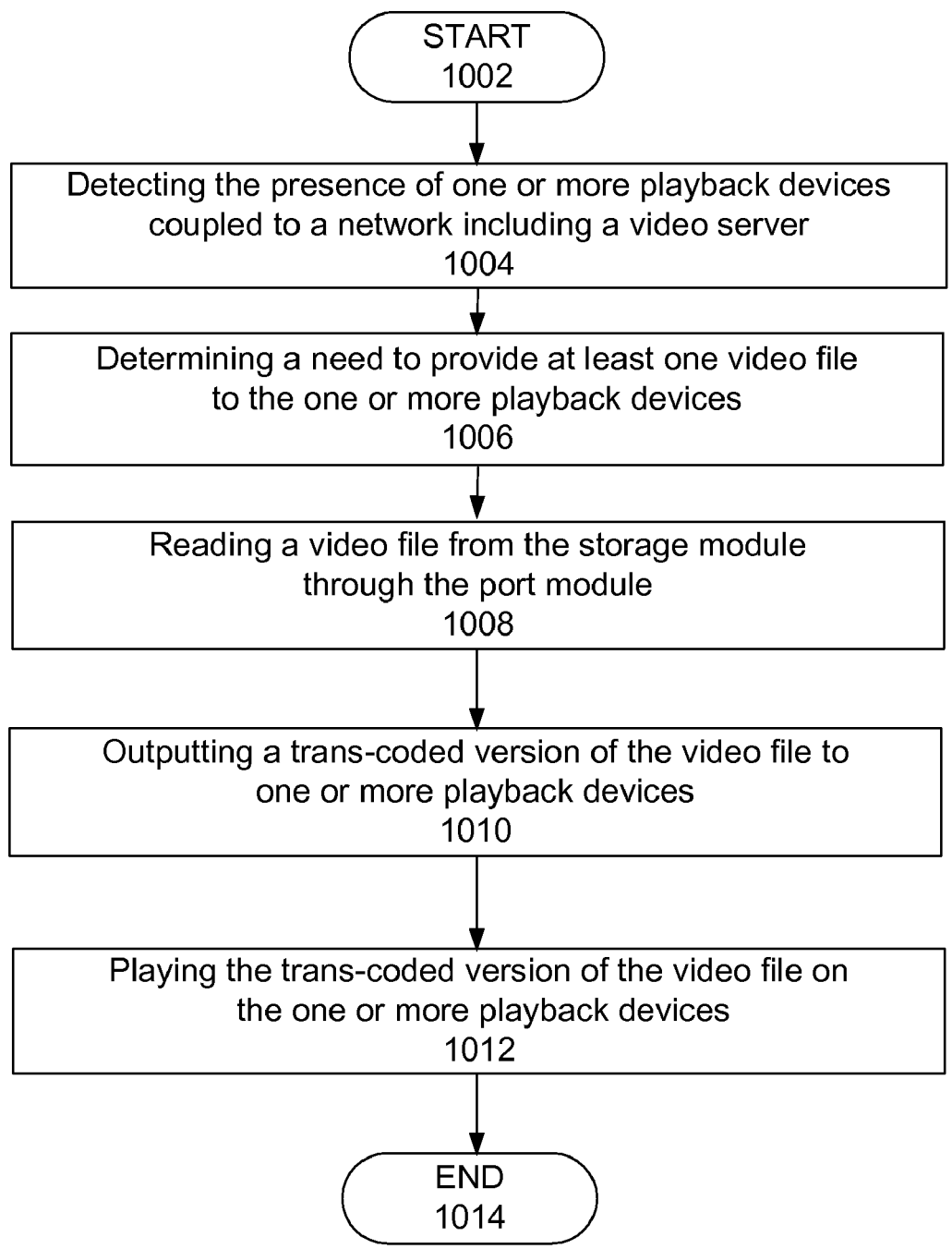
FIG. 10 illustrates a flowchart of a method to operate a video server, according to another embodiment of the invention.

FIG. 10 illustrates a flowchart of a method to operate a video server, in accordance with another embodiment of the invention. The method starts in operation 1002. Operation 1004 is next and includes detecting the presence of one or more playback devices coupled to a network including a video server. Operation 1006 is next and includes determining a need to provide at least one video file to one or more playback devices. Operation 1008 is next and includes reading a video file from the storage module through the standardized port module. Operation 1010 is next and includes outputting a trans-coded version of the video file to one or more devices through a local network and a router. Trans-coding can include changing the video format and/or the bit-rates to better match the limitations and capabilities of the ultimate video playback destination, whether it is a UPnP device coupled to the local network or a device coupled to an external network (e.g., the Internet). Operation 1012 is next and includes playing the trans-coded version of the video file on the one or more playback devices by way of a local network, or by way of a router and an external network. The method ends in operation 1014.

Figure 11:
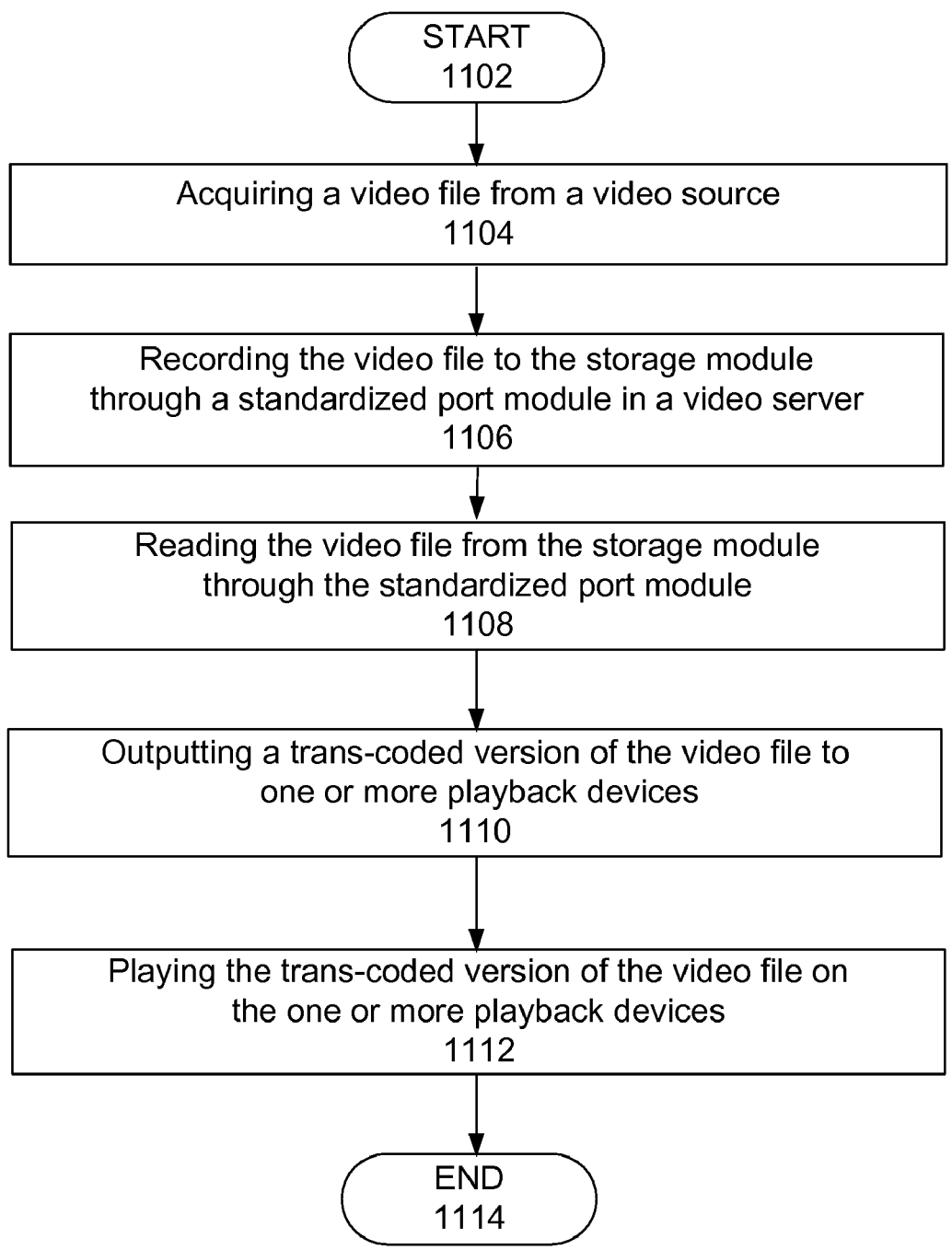
FIG. 11 illustrates a flowchart of a method to operate a video server, according to another embodiment of the invention.

FIG. 11 illustrates a flowchart of a method to operate a video server, in accordance with another embodiment of the invention. The method starts in operation 1102. Operation 1104 is next and includes acquiring a video file from a video source (e.g., a video source coupled directly to the video server, or a Storage Device coupled through a local network). Operation 1106 is next and includes recording the video file to the storage module through at least one standardized port module in the video server. Operation 1108 is next and includes reading the video file from the storage module through the standardized port module. Operation 1110 is next and includes outputting a trans-coded version of the video data to one or more playback devices through a local network and a router. Trans-coding can include changing the video format and/or the bit-rates to better match the limitations and capabilities of the ultimate video playback destination, whether it is a UPnP device coupled to the local network or a media playback device coupled to an external network (e.g., the Internet). Operation 1112 is next and includes playing the trans-coded version of the video file on the one or more playback devices by way of a local network, or by way of a router and an external network. The method ends in operation 1114.

For the purposes of this specification, the term "machine-readable medium" shall be taken to include any non-transitory medium that is capable of storing or encoding a sequence of instructions for execution by the machine and that cause the machine to perform any one of the methodologies of the present invention. The term "machine-readable medium"

shall accordingly be understood to be limited to solid-state memories, and optical and magnetic disks.

Several embodiments of the invention are possible. The exemplary embodiments described herein are for purposes of illustration and are not intended to be limiting. Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Therefore, those skilled in the art will recognize that other embodiments could be practiced without departing from the scope and spirit of the claims set forth below.

What is claimed is:

1. A method to operate a video server, comprising:
    detecting the presence of one or more playback devices coupled to a network including a video server;
    determining a need to provide a video file to the one or more playback devices;
    reading a video file from a storage module coupled to the video server through at least one standardized port module; and
    providing an optionally trans-coded version of the video file to one or more playback devices coupled to the video server through the network, wherein the optionally trans-coded version of the video file is trans-coded in the video server and the entire optionally trans-coded version of the video file is stored in at least one storage module for later retrieval, avoiding the need for the one or more playback devices to wait for real-time trans-coding, before the optionally trans-coded version of the video file is supplied through the network to the one or more playback devices to better match one or more limitations and capabilities of the network or the one or more playback devices.

2. The method of claim 1 further comprising:
    acquiring at least one video file from at least one video source coupled to the video server; and
    storing at least one video file to the storage module coupled to the video server through at least one standardized port module.

3. The method of claim 1 wherein the storage module includes at least one disk drive having a standardized port.

4. The method of claim 1 wherein the video server provides a trans-coded version of at least one video file to the one or more playback devices.

5. The method of claim 4 wherein the trans-coded version of the at least one video file includes one or more trans-coding actions selected from the group of trans-coding actions consisting of: formatting the at least one video file in another format different to the original video file format, compressing the least one video file in format, and changing the at least one video file in bitrate.

6. The method of claim 1 wherein the storage module has a standardized port that is a USB port.

7. The method of claim 1 wherein the at least one playback device includes a Universal Plug and Play Control Point.

8. The method of claim 1 wherein at least one storage device is coupled to the network and the video server stores a version of the video file to the at least one storage device.

9. The method of claim 1 wherein the video server provides a trans-coded version of at least one video file to the one or more playback devices, and the trans-coded version of at least one video file was previously stored in the storage module.

10. A system including a video server, comprising:
    a storage module having at least one standardized port module;
    a video server, coupled to the storage module through the at least one standardized port module; and
    one or more playback devices coupled to the video server through a network, wherein an optionally trans-coded file is provided to the one or more playback devices, and wherein the optionally trans-coded file is trans-coded in the video server and the entire optionally trans-coded version of the video file is stored in at least one storage module for later retrieval, avoiding the need for the one or more playback devices to wait for real-time trans-coding, before the optionally trans-coded video file is supplied through the network to the one or more playback devices to better match one or more limitations and capabilities of the network or the one or more playback devices.

11. The system of claim 10 further comprising:
    at least one video source coupled to the video server to provide at least one video file.

12. The system of claim 10 wherein the storage module includes at least one hard disk drive having a standardized port.

13. The system of claim 10 wherein the video server provides a trans-coded version of the at least one video file to the one or more playback devices.

14. The system of claim 13 wherein the trans-coded version of the at least one video file includes one or more trans-coding actions selected from the group of trans-coding actions consisting of: formatting the at least one video file in another format different to the original video file format, compressing the least one video file in format, and changing the at least one video file in bitrate.

15. The system of claim 10 wherein the storage module has a standardized port that is a USB port.

16. The system of claim 10 wherein the at least one playback device includes a Universal Plug and Play Control Point.

17. The system of claim 10 wherein the video server provides a trans-coded version of at least one video file to the one or more playback devices, and the trans-coded version of at least one video file was previously stored in the storage module.

18. A method to operate a video server, comprising:
    detecting the presence of one or more playback devices coupled to a network including a video server;
    determining a need to provide a video file to the one or more playback devices;
    reading at least one video file from a storage module coupled to the video server through at least one standardized port module; and
    outputting an optionally trans-coded version of the at least one video file to one or more playback devices coupled to the video server through the network, wherein the optionally trans-coded version of the at least one video file is trans-coded in the video server and the entire optionally trans-coded version of the video file is stored in at least one storage module for later retrieval, avoiding the need for the one or more playback devices to wait for real-time trans-coding, before the optionally trans-coded version of the at least one video file is supplied through the network to the one or more playback devices to better match one or more limitations and capabilities of the network or the one or more playback devices.

19. The method of claim 18 wherein the trans-coded version of the at least one video file includes one or more trans-coding actions selected from the group of trans-coding actions consisting of: formatting the at least one video file in another format different to the original video file format, compressing the least one video file in format, and changing the at least one video file in bitrate.

20. The method of claim 18 further comprising:
acquiring at least one video file from at least one video source coupled to the video server; and
storing at least one video file to the storage module coupled to the video server through at least one standardized port module.

21. The method of claim 18 wherein the storage module includes at least one hard disk drive having a standardized port.

22. The method of claim 18 wherein the storage module has a standardized port that is a USB port.

23. The method of claim 18 wherein the at least one playback device includes a Universal Plug and Play Control Point.

24. The method of claim 18 wherein the video server provides a trans-coded version of at least one video file to the one or more playback devices, and the trans-coded version of at least one video file was previously stored in the storage module.

25. A machine-readable storage medium having machine-executable instructions to operate a video server, comprising:

a module having machine-executable instructions to detect the presence of one or more playback devices coupled to a network including a video server;
a module having machine-executable instructions to determine a need to provide a video file to the one or more playback devices;
a module having machine-executable instructions to read a video file from a storage module coupled to the video server through at least one standardized port module; and
a module having machine-executable instructions to provide an optionally trans-coded version of the video file to one or more playback devices coupled to the video server through the network, wherein the optionally trans-coded version of the video file is trans-coded in the video server and the entire optionally trans-coded version of the video file is stored in at least one storage module for later retrieval, avoiding the need for the one or more playback devices to wait for real-time trans-coding, before the optionally trans-coded version of the video file is supplied through the network to the one or more playback devices to better match one or more limitations and capabilities of the network or the one or more playback devices.

* * * * *